United States Patent [19]

Smitka

[11] 4,123,094
[45] Oct. 31, 1978

[54] DUCT JOINT ASSEMBLY

[76] Inventor: Günter Smitka, Am Bülzgraben, 5868 Letmathe, Germany

[21] Appl. No.: 870,720

[22] Filed: Jan. 19, 1978

Related U.S. Application Data

[63] Continuation of Ser. No. 739,053, Nov. 5, 1976, abandoned.

[30] Foreign Application Priority Data

Dec. 13, 1975 [DE] Fed. Rep. of Germany ....... 2556167

[51] Int. Cl.² ............................................. F16L 23/00
[52] U.S. Cl. .................................... 285/405; 285/424
[58] Field of Search ........................ 285/405, 424, 406

[56] References Cited

U.S. PATENT DOCUMENTS

| | | | |
|---|---|---|---|
| 3,199,901 | 8/1965 | Jeppsson | 285/424 X |
| 3,712,650 | 1/1973 | Mez | 285/424 X |
| 3,923,326 | 12/1975 | Mez | 285/424 X |

FOREIGN PATENT DOCUMENTS

| | | | |
|---|---|---|---|
| 1,212,356 | 3/1966 | Fed. Rep. of Germany | 285/424 |
| 2,313,425 | 9/1974 | Fed. Rep. of Germany | 285/424 |
| 2,353,625 | 5/1975 | Fed. Rep. of Germany | 285/424 |
| 2,434,160 | 1/1976 | Fed. Rep. of Germany | 285/424 |

Primary Examiner—Thomas F. Callaghan
Attorney, Agent, or Firm—Toren, McGeady and Stanger

[57] ABSTRACT

A joint assembly for connecting at their ends a pair of ducts each consisting of side walls formed of sheet material and having a generally quadrilateral cross sectional configuration is provided by a plurality of joint sections each including a pair of perpendicularly extending flanges formed with double walls. The joint sections are mounted on the ends of each of the ducts with a duct wall extending into engagement between the double walls of one of the flanges of a joint section. Angle plates including a pair of arms and a corner region are engaged with the arms thereof extending into engagement between the double walls of the other of said flanges and by thus mounting a plurality of joint sections and angle plates at the end of each of said ducts, the ducts may be joined together by fastening means which extend through the corner regions of the angle plates. The corner regions and the arms of each of the angle plates are brought into facing relationship along lateral surfaces thereof when the ducts are joined together and the angle plates are configured with a curved configuration along such lateral surfaces so that the ends of the arms produce a pincer effect tending to enhance the tightness of the joint assembly.

13 Claims, 11 Drawing Figures

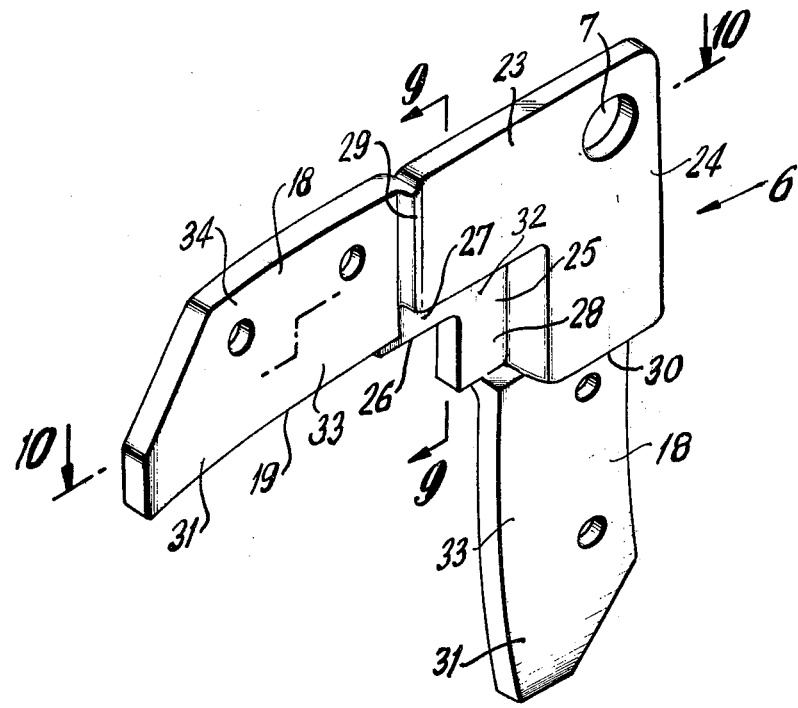
FIG.8
FIG.11
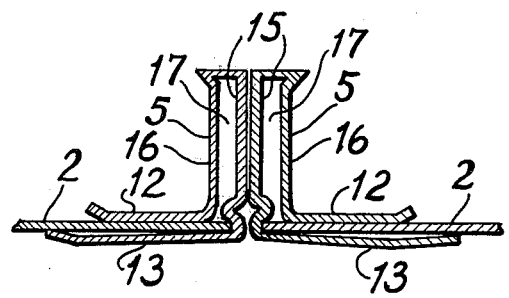
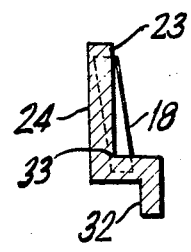
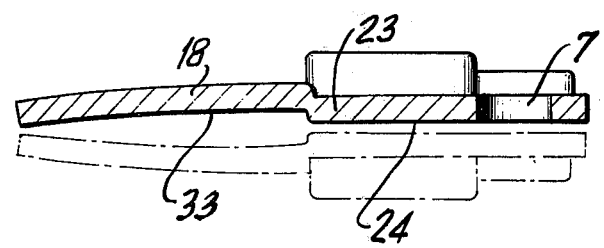
FIG.9　　FIG.10

DUCT JOINT ASSEMBLY

This is a continuation of application Ser. No. 739,053 filed Nov. 5, 1976 and now abandoned.

BACKGROUND OF THE INVENTION

The present invention relates generally to structural assemblies for joining together the ends of duct parts and more particularly to a flanged joint assembly suitable for fastening at their ends a pair of ducts made of sheet material and having a substantially rectangular cross sectional configuration. The invention is particularly suitable for use in connection with aerodynamic high-pressure plants where a particularly secure and fluid-tight joint is required.

In the connection of duct parts of aerodynamic high-pressure plants, it has previously been known to install predrilled flanged angle section frames made of angle iron over the ends of the duct parts which are then riveted or spot welded upon the duct parts. The flanged angle section frames are raised a distance above the duct parts to an extent that the ends of the duct parts project 3 to 4 mm over the end faces of the flanged angle section frames. The projecting metal strips of the duct parts are then flanged by 90° until the metal strips bear tightly on the vertical end faces of the angle sections. The duct parts provided in this way with the flanged angle section frames may then be joined with each other by screws.

Such a joint is relatively tight, particularly when a packing is inserted between the flanged frames before the duct parts are bolted together. However, a known joint of this type is rather elaborate. The individual parts of the flanged angle frames must be cut to miter and be bolted with each other. Subsequently, a weld existing at the end faces of the flanged angle frames must be surface ground and bores which are either drilled or punched must be provided in the flanged frames for fastening the individual duct parts. After the flanged frames have been applied on the individual duct parts, they must finally be provided with a suitable surface finish, for example, a coated zinc dust paint. Only then may the individual duct parts be bolted with each other.

A flanged joint of the aforementioned type is disclosed in U.S. Pat. No. 31,712,650 wherein the arm of the vertical flange facing the flange extending parallel to the duct side wall extends only to about mid height. The arm passes over an angle of less than 45° into an inclined region which is formed by a horizontal section. Because of the inclined course of the arm part, this known flanged joint is found costlier to manufacture so that the sections are relatively expensive. In addition, the mounting angle plates to be inserted into the flanges must be exactly adapted to the flanges otherwise the joint which is formed will not be stable. Finally, these mounting angle plates must be deburred in the range of the arms which are introduced into the flanges, otherwise there would occur jamming when they are inserted into the flanged sections primarily due to the fact that the cold-rolled sections have unavoidable inside radii at their deflection points where sharp edged arms of the mounting angle plates will chafe thereby impeding an easy introduction.

The present invention offers a joint assembly which features the advantage of being low in cost and stable in its construction. The tightness of the joint is improved by the arrangement of the present invention and a relatively air tight duct joint may be achieved. Furthermore, in joints of this type some criticality exists with regard to the tightness of the corner regions of the joint and packing difficulties which may be caused by dimensional tolerances may appear in regions of the flanged joint. Thus, the invention is directed toward providing an assembly which enables general improvement in the packing of the joint.

SUMMARY OF THE INVENTION

Briefly, the present invention may be described as a joint assembly for connecting together at their ends a pair of ducts formed of sheet material and having congruent generally quadrilateral cross sectional configurations. The duct side walls are generally planar and joined together longitudinally to form corners of the quadrilateral configuration with the joint assembly of the invention comprising a plurality of joint sections each including a pair of generally perpendicularly extending flanges formed of double walls, said joint sections each being mounted on the ends of said ducts with one of said flanges having the end of one of the side walls of a duct engaged therein between its double walls. Said one flange thereby extends generally parallel to the side wall engaged therein while the other flange extends generally perpendicularly to the side wall. Angle plates including a pair of arms and a corner region from which said arms extend are joined with the joint sections by inserting the arms of the angle plates to between the double walls of the other perpendicularly extending flange of the joint section. A plurality of said joint sections and of said angle plates are mounted on the end of each of the ducts to be joined together with the angle plates extending about the corners of the ducts. The corner region and the arms of each of the angle plates include lateral surfaces which are brought into facing relationship when the ducts are joined together. The angle plates are formed such that a degree of curvature is imparted thereto along these lateral surfaces. As a result, a pincer effect is obtained between facing angle plates thereby enhancing the tightness and the joining characteristics of the assembly.

By a further aspect of the invention, the side of each angle plate upon which the lateral surfaces extend is formed with an inclination so that abutting angle plates are pressed together with a greater force along edge portions thereof more remote from the duct side walls. With the attachment of joinder screws extending through the angle plates, the arms of the angle plates act on the sections in such a way that the sections are more compressed at their outer edges than at the inner edges. Accordingly, a packing or packing material arranged between the sections of adjacent duct parts will also be compressed more on the outside than on the inside, taken relative to the interior of the connected ducts. The space occupied by the packing assumes a wedge-shaped cross sectional configuration so that the packing is admitted by the internal pressure of the duct in the direction of the tapering wedge cross section thus increasing the sealing effect. The effect achieved with the solution according to the present invention is of particular advantage in an embodiment where the arms of the angle plates are arranged in a plane extending in an acute angle to the plane of the corner region. The desired effect may also be achieved by shaping the arm of the angle plates as a wedge tapering toward the outside of the angle plates. Independently thereof or in combination therewith, it is possible to curve the lateral surfaces of the arm facing the end face of the duct so that it forms a concave configuration terminating in a plane formed by the lateral surface of the corner region or between this plane and a plane formed by the end face of the duct. This has the additional advantage that the end of the arm exerts a surface pressure in the central region of the section, thus avoiding opening of the flanged joint and creating a "lobster claw" or pincer effect.

Sealing of a flanged joint of the type described requires a packing arranged between the sections but at least between the corner regions of interconnected angle plates. It is naturally particularly important in the region of the interconnected angle plates. In order to maintain the stresses within desired limits and to ensure at the same time that the packing is not cut off or forced out of the flanged joint when the angle plates are bolted together, it is desirable to provide on the inside of the corner regions an angular pocket which is open toward the end faces of the duct and which extends over the inside of the corner regions and receives the packing.

The pocket thus formed between abutting angle plates may have its terminal sides defined by lateral surfaces of the angle plates lying in a plane generally continuous with the lateral surfaces of the arms on which the packing is applied or pasted and which seals the corner region completely after the flanged joint is assembled.

It may also be advantageous to arrange each terminal side of the pocket in a plane which is displaced away from the duct end of the angle plate taken relative to the plane formed by the lateral surface of the arms. This not only achieves additional stabilization of the overall construction but will also effect an improvement in the packing which is provided.

The distance between the terminal side of the pocket and the lateral surface of the arm is preferably 3 to 4 times the plate thickness of the duct parts so that an additional packing may be arranged in the pocket.

To ensure that the arrangement of the flanges on the end face of the duct and particularly the assembly of sections and angle plates at the corners of the duct are not disturbed by folds or doubling of the duct plate in this region, it is advantageous to form the length of the packet arms greater or equal to the width of the fold on the duct parts.

In a preferred embodiment of the invention, the flanges of the joint sections extending perpendicularly to the duct side walls are formed with a beaded fold extending over their length and pointing inwardly away from the end of the duct. The joint sections are formed so that the underside of the beaded fold will bear upon the duct side wall and so that the lower edge of an arm of the angle plate inserted into the joint section bears against the top side of the fold. This may result in relatively large gaps in the corner region of the angle plate between the angle plate and the duct wall. This may be prevented by making the boundary edges of the pocket arranged on the inside of the angle plates to project over the adjacent boundary edges of the arms by an amount corresponding to the double plate thickness of the section. Thus, the inner boundary edges of the pocket will bear in the mounted state on the outside of the duct part.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 8 is a perspective view showing another embodiment of the angle plate in accordance with the present invention;

FIG. 9 is a section taken along the line 9—9 of FIG. 8; and

FIG. 10 is a section taken along the line 10—10 of FIG. 8 with a second angle plate being shown in corresponding section in dotted line to illustrate the assembled positions of the angle plates; and FIG. 11 is a sectional view showing a pair of ducts in the assembled condition.

DETAILED DESCRIPTION OF THE PREFERRED EMBODIMENTS

Figure 1:
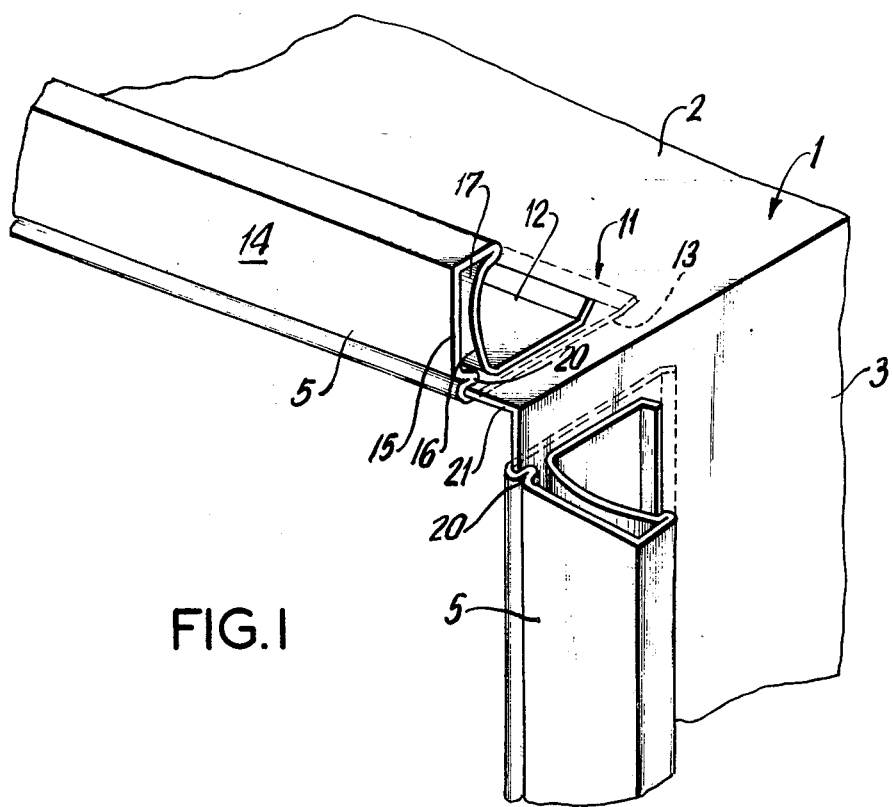
FIG. 1 is a partial perspective view of the end of a duct having joint sections mounted on the ends of the wall thereof showing the corner angle plates removed for the purposes of clarity.
Figure 3:
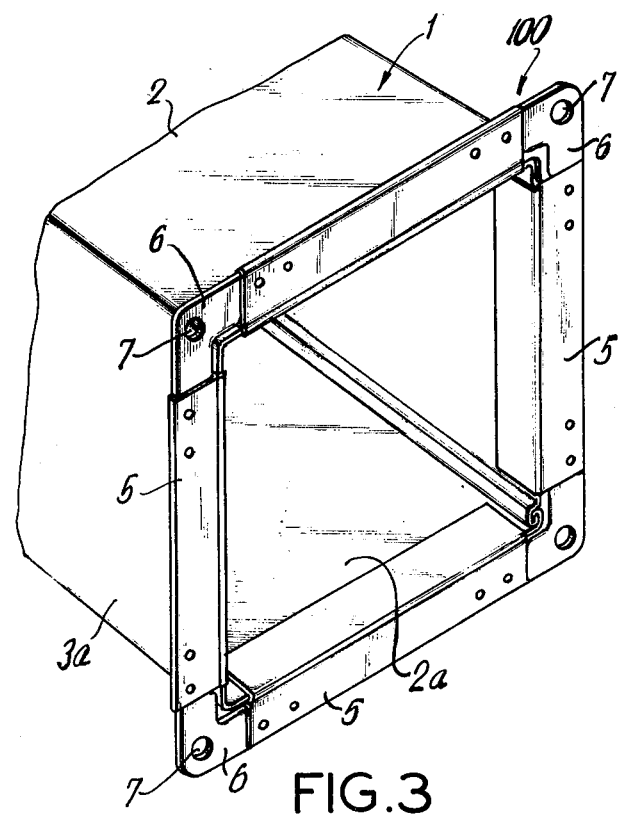
FIG. 3 is a perspective view showing the end of one duct having all the angle plates and the joint sections mounted thereon and ready for joinder with a corresponding duct.
Figure 4:
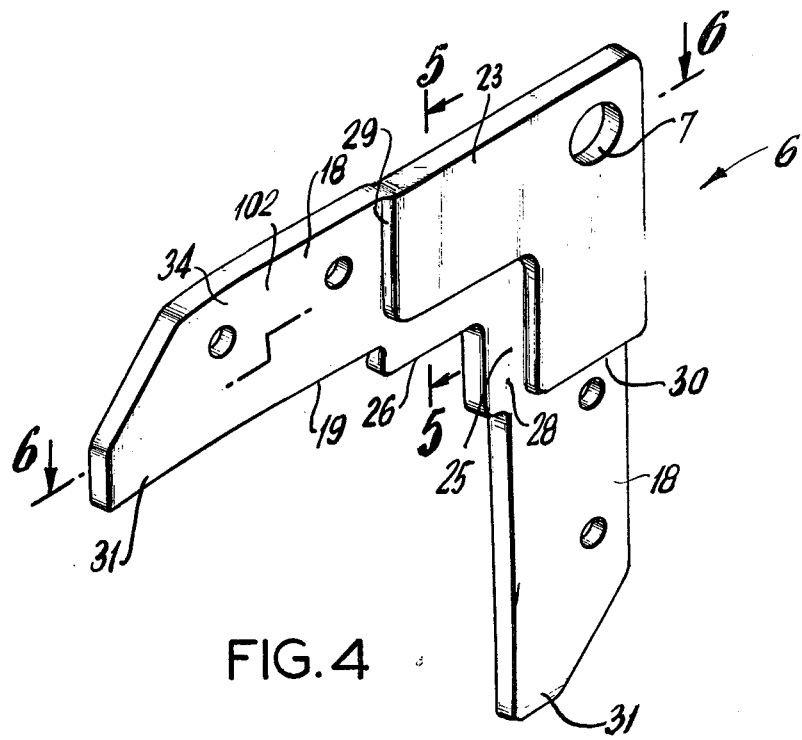
FIG. 4 is a perspective view of an angle plate in accordance with the present invention
Figure 5:
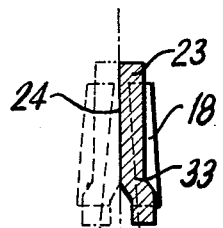
FIG. 5 is a sectional view taken along the line 5—5 of FIG. 4 with a second angle plate being shown in a corresponding section in dotted line to illustrate the mounting position.

Referring now to the drawings, wherein like reference numerals are used to refer to similar parts throughout the various figures thereof, there is shown in FIGS. 1 and 3 the end region of a duct 1 which includes an upper duct side wall 2, lateral duct side walls 3 and 3a, and a lower wall 2a. The duct 1 is formed of four side walls in a quadrilateral sectional configuration made of sheet material, preferably sheet metal, which may have any desired dimensions. The joinder of two ducts similar to that shown in FIG. 3 is effected by means of a joint assembly 100 which consists essentially of four joint sections 5 each attached to one of the walls of a duct, and four angle plates 6 engaged around each corner of the duct between adjacent joint sections 5.

It is to be understood that a second duct similar to that shown in FIG. 3 may be joined thereto by bringing the duct ends into abutting relationship.

The joint sections 5 preferably consist of cold-rolled "sendzimier" galvanized plate and they are connected with each other by means of angle plates 6, depicted in greater detail in FIGS. 4–10, so that a prefabricated unit may be obtained. Each of these units may be pushed over the end faces of a respective duct such as the duct 1 and after this connection has been achieved, the ducts may be connected with each other by means of screws (not shown) which are introduced into holes 7 extending through the angle plates 6. Each of the joint section 5 consists essentially of a flange 11 which, with the joint section 5 in the mounted position, extends parallel to a side wall such as the side wall 2 of a duct. The flange 11 comprises double walls consisting of an outer wall 12 and an inner wall 13. A second flange 14 extending perpendicularly to the duct side wall when the joint section 5 is mounted thereon also includes double walls and comprises a front wall 15 and a rear wall 16. The rear wall 16 is curved and the outer side thereof is concave as shown in the represented embodiment. The double walls 15 and 16 of the flange 14 are adapted to receive therein arms, such as the arms 18 of the angle plates 6. One or both of the walls 15 and 16 may be curved, or they may be partially curved. Alternatively, they may be formed with a planar configuration. The distance between the walls 15 and 16 is formed so that an arm 18 of the angle plate 6 may be inserted into the cavity 17 formed therebetween in the manner indicated in FIG. 2. The arm 18 will then bear with its lower boundary edge 19 on the upper side of a labyrinth beaded fold 20 which is embossed on the wall 15 and which projects into the cavity 17. The underside of the beaded fold 20 operates together with the inner wall 13 as a border or stop for the duct side wall 2 whose front edge 21 bears against the inside of the wall 15 below the beaded fold 20.

Figure 2:
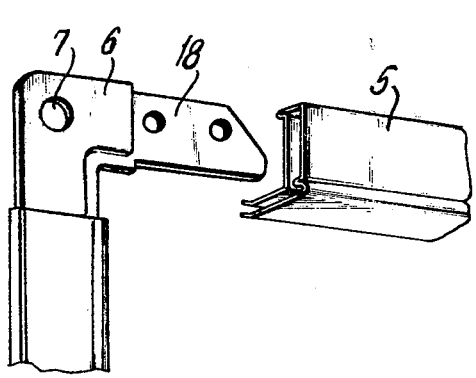
FIG. 2 is a perspective view showing in some detail how the angle plates are engaged with the joint sections.

The angle plate 6 depicted in FIG. 2 comprises a pair of indential arms 18 which extend substantially perpendicularly to each other and which are joined with each other through a corner region 23 which is displaced or offset relative to the arms 18. As will be seen particularly from FIGS. 5 and 7, the portion of the arm 18 which is inserted into the flange 14 extends transversely to its longitudinal extension at an acute angle α to the plane of the corner region 23 such that the lateral surface 33 of the side facing toward the opposite plate is angled to make contact with greater pressure along its exterior edge. When screws extending between a pair of angle plates 6 are tightened to join together the ends of adjacent ducts, the outer edges of the joint sections 5, taken relative to the interior of the duct, will be under a greater force of compression than the inner edges thereof so that a packing which is arranged between the sections 5 and between adjacent ducts will not be forced out of the joint assembly. Furthermore, packing problems which result from tolerance deviations of the sections and of the joint assembly are thus eliminated. As mentioned above, it is also possible to achieve a similar effect by forming the arms of the angle plates with a wedge-shaped cross sectional configuration. Such a wedge-shaped cross section may also be provided in addition to the measures of the relative plane displacement indicated above.

Figure 7:
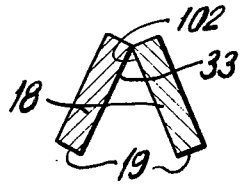
FIG. 7 is a sectional view showing in exaggerated form how a pair of arms of two abutting angle plates may be angled to provide a specific clamping effect with the joint assembly of the invention in the assembled condition.

Thus, with reference to FIG. 7, it will be seen that with the device of the invention in the assembled condition, and with the arms 18 inclined as shown, edges extending along an outer portion 102 of the arms 18 will abut with greater force than the inner edges 19 of the arms. It will be understood the terms "inner ∞ and "outer" are taken relative to the duct 1 and that the portions 102 are spaced relatively further away from the interior of the duct than portions adjacent the edges 19.

In order to ensure that a tight seal which meets the requirements of the assembly is effected in the corner region 23, the angle plate 6 has on the inside of the corner region 23 an angular pocket 25 which opens toward the interior of the duct upon which the plate 6 is mounted. The pocket 25 is formed with a base surface which is arranged in the same plane as the plane of the lateral surfaces of the arms 19. The pocket 25 has an inner or lower boundary edge 26 which projects relative to the inner boundary edge 19 of arm 18 by an amount which corresponds substantially to the double plate thickness of the joint section 5 and thus to the height or thickness of the double layer of the beaded fold 20. In the assembled state of the joint assembly, the boundary edge 26 thus bears upon the outer side of the duct side wall 2 and no clearance or merely a very small gap will be formed. Into the pocket 25 there may be inserted or pasted a packing strip which seals the corners after the joint assembly has been assembled.

In the case of a duct which has been formed from a plate strip whose edges are folded in the range of the corners, the corner region 23 with the pocket 25 may be extended a sufficient distance in order to avoid undesired deformation of the joint sections 5 and the fold will be located under the corner region 23. In this case, the dimensions of the pocket, i.e. the length of the pocket arms 27, 28, must be equal to the width of a fold on the duct 1. The dimensions of the corner region 23 may then be so selected that the corresponding arms of the corner region 23 terminate with the pocket arms 27, 25 on boundary surfaces 29, 30 which strike, in the assembled state of the flanged joint 4, against the end faces of the arms 15 on the sections 5.

In order to facilitate insertion of the arms 18 into their respective cavities 17 of the joint sections 5, the ends 31 of the arms 18 are bevelled.

A further embodiment of the angle plate 6 is represented in FIGS. 8–10 wherein similar reference numerals are utilized to identify similar parts. The pocket 25 is displaced in this angle plate 6 relative to the plane of the lateral surfaces of the corner region 23 and the arms 18 so that its base surface 32, seen from the end face of the duct, is behind both the lateral surface 24 of the corner region 23 and behind the lateral surfaces 33 of the arms 18. In this manner an angle plate having inner lateral surfaces which lie in three planes is obtained. The distance between the base surface 32 and the lateral surfaces 33 should be about three or four times the plate thickness of the duct 1 so that the front edge 21 of the duct side wall 2 projects below the lower boundary edge 26 of the pocket 25 in the assembled condition of the joint assembly and may be flanged about the boundary edge 26 into pocket 25.

Pocket 25 may receive additional packing material in order to seal the corner regions of the assembled joint in a more thorough manner.

Figure 6:
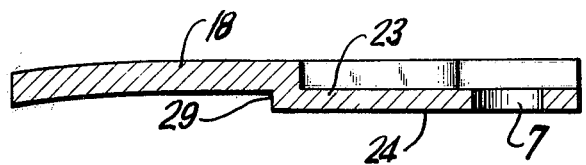
FIG. 6 is a sectional view taken along the line 6—6 of FIG. 5.

As will be seen particularly from FIGS. 6 and 10, the arms 18 are curved so that with the joint assembly in the assembled condition the ends 31 of abutting arms 18 will produce a pincer or "lobster claw" effect. When two adjacent ducts 1, each provided with a joint assembly 100, are bolted together, the parts of the joint section 5 in the range of the ends 31 are therefore more compressed because the bolted angle plates 6 will act as a pincer thereby exerting an enhanced clamping force. Opening of the joint sections is thus prevented and the influence of dimenstional tolerance diviations of the sections 5 is reduced. The simultaneous arrangement of the arms 18 with a slanted or tilted attitude leads beyond that to a displacement of the principal compression region or point toward the outside of the sections 5 so that the greatest pressure exerted by the arms 18 will be approximately in the region designated by reference numeral 34 located along the edge area 102.

Thus, it will be seen that in the construction of a joint assembly in accordance with the present invention, four joint sections such as the joint sections 5 are first placed on each end of the ducts to be joined after the joint sections have been assembled together with the angle plates 6, in the manner depicted in FIG. 2. If the ducts have a quadrilateral cross sectional configuration, four joint sections are mounted thereon with one joint section being attached to the end of one side wall of each of the ducts. The duct side walls are brought into engagement between the walls 12, 13 of the joint sections 5 and after four joint sections have been assembled together by bringing the angle plates 6 into place in the manner depicted in FIG. 2, the four joint sections are applied to the ends of a duct as represented in FIG. 3. The angle plates 6 are mounted by inserting their arms 18 into the cavity 17 formed between the walls 15, 16 of the joint sections. With the assembled joint sections and angle plates mounted upon a duct end, as shown in FIG. 3, the angle plates 6 will extend around the corners of the ducts and of the joint assembly. The ducts may then be brought together and after the packing material has been suitably located in place, for example, within the pockets 25 formed between adjacent angle plates, bols or screws may be placed through the holes 7 in the angle plates 6 and the overall assembly may be joined together by tightening of the bolts or screws extending through the angle plates 6.

As a result of the particular structure and configuration of the invention, a tight and effective sealing action is achieved with several advantages being produced as a result of the particular configuration of the elements of the invention, particularly the arms of the angle plates 6. The curvature of the arms 18 will produce a pincer effect at their abutting ends. The slanted attitude of the arms 18 will produce an area of greatest pressure outwardly of the ducts thus tending to avoid displacement of the packing material. This, together with the formation of the pockets 25 in either of the alternative manners indicated will produce an effective tight joinder assembly which is relatively simpler in design and less expensive in cost.

While specific embodiments of the invention have been shown and described in detail to illustrate the application of the invention principles, it will be understood that the invention may be embodied otherwise without departing from such principles.

What is claimed is:

1. A joint assembly for connecting together at their ends a pair of ducts each consisting of sheet material forming side walls of said ducts, said ducts having congruent polygonal cross sectional configurations, said side walls being planar and joined together longitudinally of said ducts to form corners of said polygonal configuration, said joint assembly conprising:
   a plurality of joint sections, each of said joint sections being formed to include a pair of generally perpendicularly extending flanges;
      said flanges each being formed of double walls, with one of said flanges being adapted to engage therebetween one of the side walls to said ducts;
   said joint sections each being mounted on the ends of said ducts with said one flange of each joint section having engaged between its double walls the end of one of said side walls of said ducts;
   there being provided one joint section for each of the side walls of each of said ducts; and
   a plurality of angle plates each including a corner region having a pair of arms extending from said corner region;
   each of said angle plates being positioned within said joint assembly with each of said arms extending to between the double walls of the other of said flanges of said joint sections;
      each of said angle plates being arranged so that its arms extend oppositely from said corner region into flanges of adjacent joint sections of one of said ducts;
   said corner regions of each of said angle plates on one of said ducts being connected with a corner region of one of the angle plates on the other of said ducts, with each arm of each of said angle plates on one duct being brought into generally facing relationship across said joint assembly with an arm of an adjacent angle plate on the other of said ducts;
      each pair of facing arms thus pressing therebetween one of the double walls of the flanges within which each said arms extend, each pair of arms therefore pressing therebetween two walls, one each from different flanges;
   each of said arms of each of said angle plates being formed with a curved configuration which extends from said corner region outwardly therefrom to the end of each arm;
   the curved configuration of said arms being oriented so that each of said pair of facing arms is arranged with the ends of each arm curving toward the end of the facing arm across the joint assembly to provide enhanced joinder pressure at the ends of each pair of arms, said curved configuration of the arms thus operating to form from each pair of facing arms individual pairs of pincers to enhance the joinder pressure by which said joint sections connect together said pair of ducts.

2. An assembly according to claim 1 wherein said ducts include an interior surrounded by said side walls, and wherein said arms include an inner edge portion and an outer edge portion, said inner edge portion being located closer to the interior of said duct than said outer edge portion, said arms being formed with a slanted attitude which causes the outer edge portions of said adjacent arms forming said pincer to be urged together with a greater compressive force than said inner edge portions thereof when said ducts are connected by said joint assembly.

3. As assembly according to claim 1 wherein said arms are arranged in a plane which extends at an acute angle relative to the plane of said corner region.

4. An assembly according to claim 1 wherein each of said arms is designed as a wedge tapering toward the outside of said duct angle.

5. An assembly according to claim 1 wherein said corner region and said arms of each of said angle plates include lateral surfaces which are brought into facing relationship when said ducts are joined together and wherein the lateral surfaces of said arms facing toward the end of said duct are concave and terminate at the ends of said arm in a plane formed by the lateral surface of the corner region.

6. An assembly according to claim 1 wherein said corner region and said arms of each of said angle plates include lateral surfaces which are brought into facing relationship when said ducts are joined together and wherein the lateral surfaces of said arms facing toward the end of said duct are concave and teminate at the ends of said arms in a plane formed between the lateral surface of said corner region and a plane formed by the end face of said duct.

7. An assembly according to claim 1 wherein an angular pocket opening toward the end of said duct is formed on the inside of said corner region.

8. An assembly according to claim 7 wherein said pocket is formed with a base arranged in a plane formed by the lateral surfaces of said arms.

9. An assembly according to claim 7 wherein said pocket is formed with a base arranged in a plane which is displaced toward the duct side of the angle plate with respect to the lateral surfaces of said corner region.

10. An assembly according to claim 8 wherein the distance between said base of said pocket and the lateral surfaces of said arms is between three to four times the plate thickness of the duct parts.

11. An assembly according to claim 7 wherein said pocket is formed to comprise a pair of generally perpendicularly extending arms and wherein said duct is formed with a fold having a width dimension, the lengths of said pocket arms being at least equal to the width of said fold on said duct.

12. An assembly according to claim 5 wherein said pocket terminates at boundary edges thereof arranged on the inside of said angle plate and wherein said boundary edges of said pocket project over adjacent boundary edges of said arms by an amount which corresponds to double the plate thickness of said sections.

13. As assembly according to claim 1 wherein said other of said flanges of said joint sections has one of its double walls configured to form a beaded fold which extends toward said other double wall of said other flange, said beaded fold lying in abutment with the end of said duct engaged between the double walls of said one flange of the same joint section, with said beaded fold being positioned between an edge of one of said arms of said angle plates and the abutting duct end with said ducts connected by said joint assembly.

* * * * *